FIG: 1
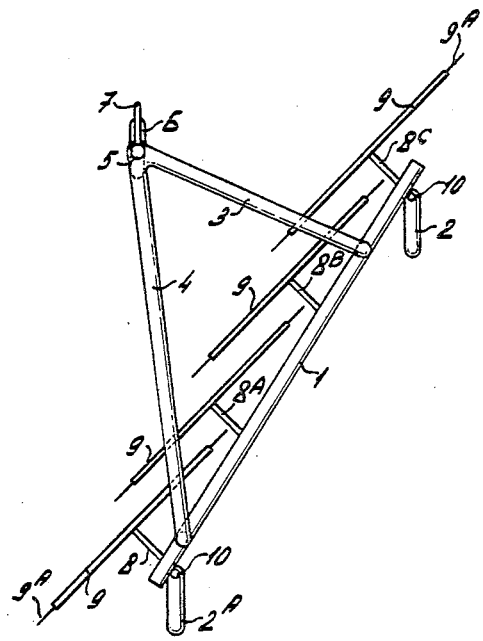

June 3, 1958   C. VAN DER LELY ET AL   2,836,953
SIDE DELIVERY RAKE WITH RUNNING WHEEL SUPPORTING MEANS
Filed Feb. 2, 1954                          5 Sheets-Sheet 2
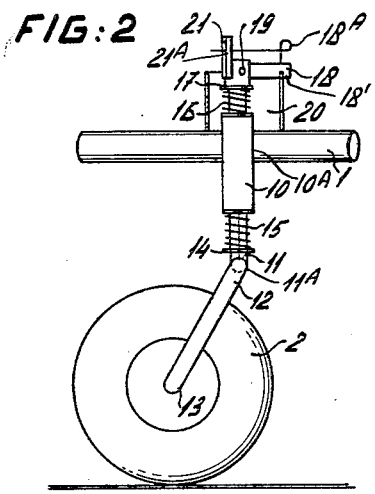
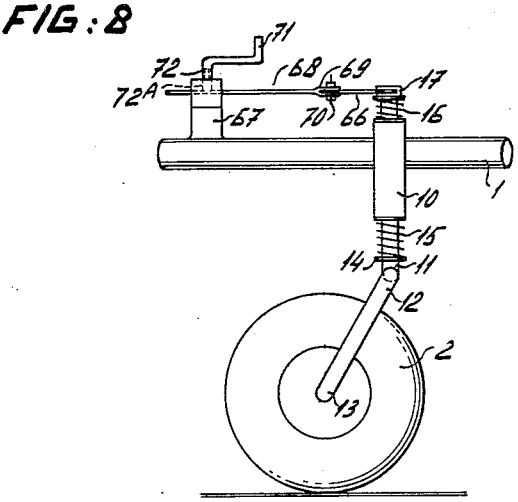
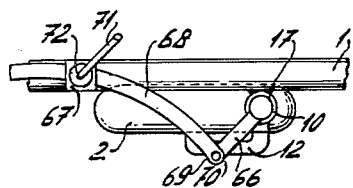

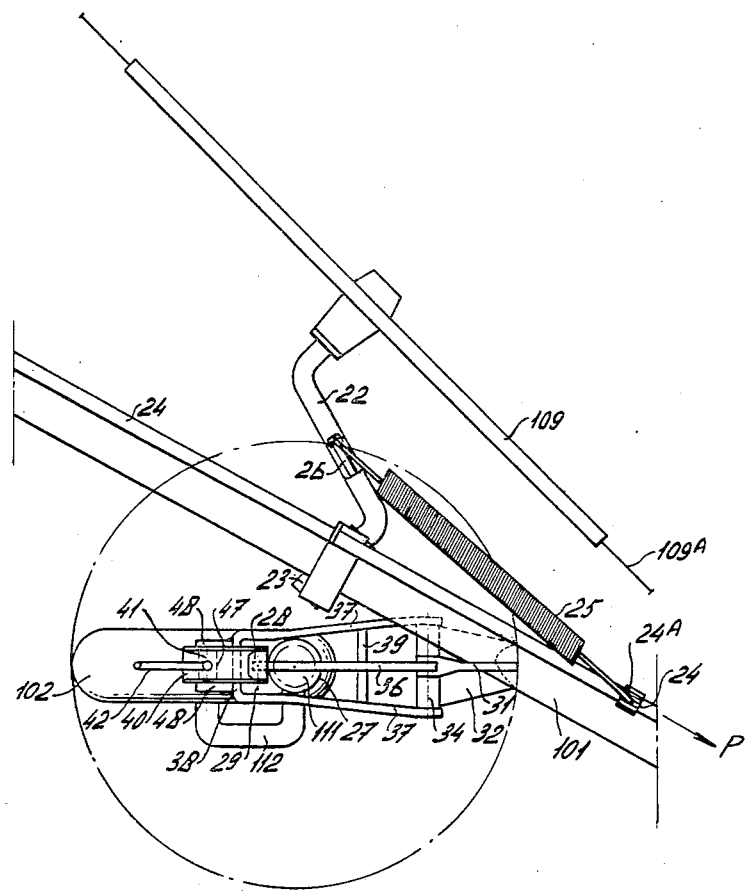
FIG:3

FIG:4
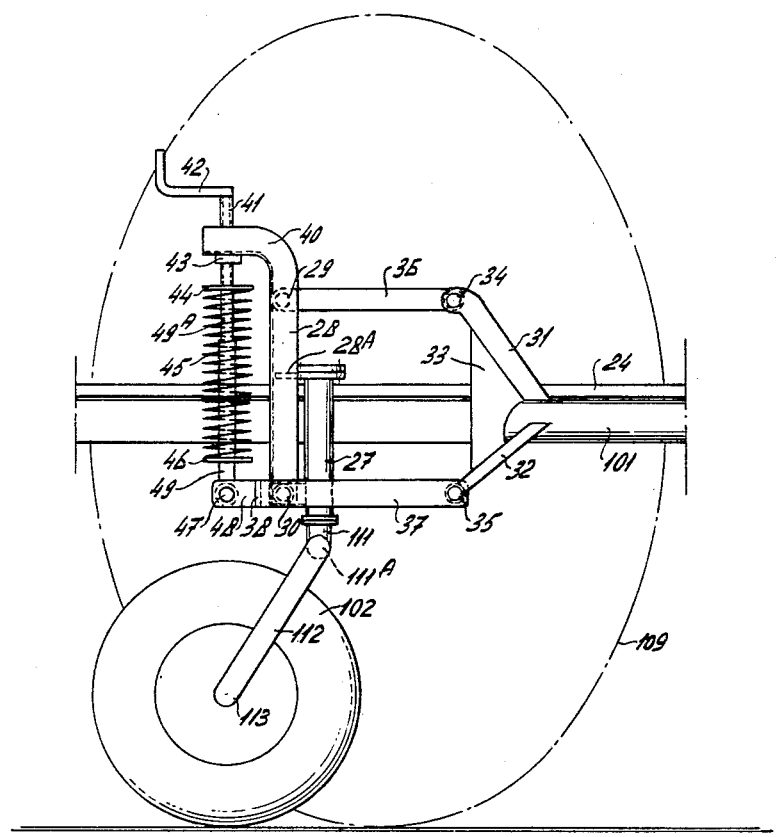

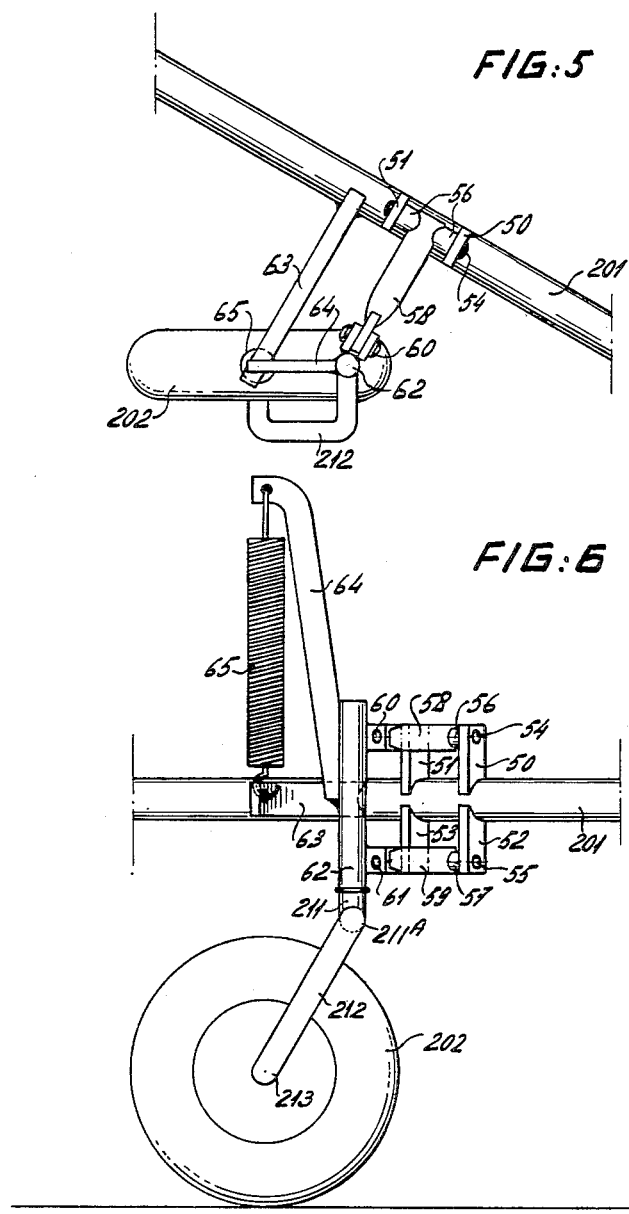

United States Patent Office 2,836,953
Patented June 3, 1958

2,836,953

SIDE DELIVERY RAKE WITH RUNNING WHEEL SUPPORTING MEANS

Cornelis van der Lely and Ary van der Lely, Maasland, Netherlands, assignors to C. van der Lely N. V., Maasland, Netherlands, a Dutch limited company of the Netherlands Application February 2, 1954, Serial No. 407,772

Claims priority, application Netherlands February 6, 1953

8 Claims. (Cl. 56—377)

This invention relates to devices for laterally displacing material lying on the ground by means of raking members put into motion by contact with the ground and/or said material, said raking members being attached to a frame which is movable on running wheels.

Devices of this kind are generally known and are always provided with a frame which is non-resiliently supported by running wheels, the means carrying the raking members being connected to the frame so as to permit vertical movement with regard to said frame, in order that vulnerable parts of the device will be more or less protected from shocks to which the frame might be subjected during movement of the running wheels over uneven ground.

According to the invention, elastic means are mounted between the running wheels and the frame, so that the running wheels are adapted to move in vertical sense with respect to the frame. By the resilient mounting of the frame on the running wheels in this manner, several advantages will be obtained. In case of a relatively stiff spring mounting, no interference will occur with the smaller resiliency of the rake wheels, while the operation is greatly facilitated by the elastic mounting of the running wheels at least one of which has to transmit an appreciable lateral force into the ground, which function is disturbed in a non-spring mounted frame, since the wheel pressure, especially at high speeds, will greatly vary and because of the skidding which occurs at low wheel pressure. In a wheel which is elastically mounted, the wheel pressure is constant and there will be no tendency to skid. Skidding does not only affect the raking action unfavourably, but is also tiresome for the driver. Further, the energy which during skidding and subsequent braking is transformed into heat has to be produced by the draught-animal or the tractor and results in a required average drawing force which considerably exceeds the necessary minimum.

With a resilient mounting of the frame on the running wheels, moreover, in a device provided with one or more rake wheels, the axle of each rake wheel may be non-resiliently fixed to the frame. It will be understood that in this case the resiliency of the running wheels should be less than in the case where the rake wheels are likewise resiliently connected to the frame. The omission of the elastic means in the rake wheels will lead to a large saving in weight which is decreased only slightly by the arrangement of the elastic means in the running wheels. Consequently the frame may be made lighter in weight, so that a device can be realized with less weight than heretofore known and which may be, therefore, advantageously fabricated with a small consumption of material, said device being very useful in operation due to the fact that it requires only a small drawing force.

The invention will be hereinafter described in greater detail with reference to the accompanying drawings in which some embodiments of the invention are illustrated by way of example and in which:

Fig. 1 shows a diagrammatic plan view of a side delivery rake according to the invention;

Fig. 2 is an enlarged side elevation of the resilient attachment of a running wheel to the frame of the side delivery rake shown in Fig. 1;

Figs. 3 and 4 show respectively in plan view and in side elevation on an enlarged scale a detail of an alternative embodiment of the side delivery rake according to Fig. 1;

Figs. 5 and 6 show respectively in plan view and in side elevation a detail of another embodiment on an enlarged scale;

Figs. 7 and 8 show respectively in plan view and in side elevation an enlarged detail of a third embodiment.

In the embodiment shown in Figs. 1 and 2, the frame of the side delivery rake comprises a beam 1 supported by running wheels 2 and 2A and connected by bows 3 and 4 to a vertical bush 5. In this bush is rotatably mounted a supporting rod for a running wheel 6 to which supporting rod is fixed at the same time a draw hook 7. The beam 1 further carries four fixed horizontal axles 8, 8A, 8B and 8C upon each of which is mounted a rake wheel 9 provided with circumferential teeth 9A. The mounting of the running-wheels 2 and 2A on the beam 1 appears in Fig. 2 in which this mounting is shown for the running wheel 2.

To the beam 1 is secured at 10A a vertical bush 10 in which is rotatably mounted a shaft 11. The lower end 11A of the shaft 11 is rigidly connected by a rod 12 to the axle 13 of the running wheel 2. The shaft 11 carries an integral ring 14. Between said ring 14 and the lower end of the bush 10 is accommodated a compression spring 15 surrounding the shaft 11. The part of the shaft 11 extending above the bush 10 is surrounded by a compression spring 16 which is accommodated between a ring 17 arranged near the upper end of the shaft 11 and the upper end of the bush 10.

Normally the beam 1 of the frame springs on the spring 15. The spring 16 limits in a resilient manner the movement of the wheel 2 away from the beam 1, if the wheel 2 rolls through a pit or if the frame is lifted up, while the spring 16 ensures at the same time that the spring 15 always bears with a determinable pressure against its abutments.

Moreover on the shaft 11 and the beam 1, a device is provided with which the position of the plane of the running wheel 2 may be adjusted in relation to the beam 1. Said device comprises an arm 18 which is able to rotate in a vertical plane or a horizontal pin 19 mounted in the shaft 11, but which cannot rotate in horizontal sense without turning the wheel 2 about the center line of the bush 10, said arm 18 cooperating with notches 18' in the horizontal upper edge of a curved plate 20 welded to the beam 1 and concentrically arranged around the center line of the bush 10. If the arm 18 rests in a definite notch, the plane of the running wheel 2 has a determined position with regard to the beam 1.

In order to prevent, upon relative movement of the shaft 11 and the beam 1 in vertical sense, the arm 18 from leaving the notch, said arm is resiliently maintained in the notch by the pressure of a spring 18A bearing with one extremity upon the arm 18 and passing with its other extremity loosely through an opening 21A in an extension 21 of the shaft 11.

The side delivery rake which is partially shown in Figs. 3 and 4 differs from the rake shown in Figs. 1 and 2 mainly in two respects. In the first place the rake wheels 109 having circumferential teeth 109A are mounted, instead of on axles which are fixedly connected to the beam 101, on the crank pins of cranks 22 the shafts of which are rotatably mounted in bearings 23 on the beam 101. The weight of each rake wheel 109 is partly counter-balanced by a tension spring 25 extending between a lug 26 on the related crank 22 and a point 24A on a rod 24 which is mounted on the beam 101 and is longitudinally slidable with respect to the latter, so that the pressure of the rake wheels on the ground can be reduced by displacing rod 24 relative to beam 101 in the direction of the arrow P (Fig. 3) so as to increase the forces of the tension spring 25 associated with each crank 22. Further, the running wheel 102, the axle 113 of which is likewise connected by a rod 112 to a vertical shaft 111 at 111A, instead of being slidable with said shaft in a bush, is only rotatable within a bush 27.

The bush 27 is rigidly secured at 28A to a bar 28 in which two parallel horizontal pins 29 and 30 are mounted. The beam 101 carries supporting members 31 and 32 which are interconnected by a stiffening gusset 33. The extremities of the members 31 and 32 carry parallel horizontal hinge pins 34 and 35. The distance between the pins 34 and 35 is equal to the distance between the pins 29 and 30. Between the pins 29 and 34 extends a rod 36, and between the pins 30 and 35 the two limbs 37 of a fork 38 are provided, said limbs 37 carrying a transverse bar 39. The distance between the pins 30 and 35 is equal to the distance between the pins 29 and 34, so that if the beam 101 has a definite position, the bar 28 and consequently also the shaft 11 can be only displaced through positions which are all parallel to each other.

The bar 28 is provided at the upper end with a bent portion 40 which is traversed by a screw spindle 41. Said screw spindle 41 is provided at its upper end with a crank 42 by means of which the spindle can be screwed into a nut 43 integral with the lower side of the arm 40. The spindle 41 further carries a disk 44 against which rests one end of a compression spring 45 the other end of which bears against a disk 46 which transmits the pressure to a pin 47 mounted in arms 48 extending from the fork 38. A vertical tube 49 connects the disk 46 to the pin 47 and has an open upper end which accommodates the smooth lower end 49A of the screw-spindle 41. This end 49A can freely rotate and slide in the tube 49.

In order to obtain a definite desired average position of the beam 1 in relation to the ground for a given average load of the running wheel 2, the screw spindle 41 has to be adjusted to a predetermined position with regard to the nut 43, which position can be reached by turning the spindle 41 by means of the crank 42.

A third embodiment of the fixation of the running wheel 202 to the beam 201 is shown in Figs. 5 and 6. In this embodiment the beam 201 carries extensions 50, 51, 52 and 53. The extensions 50, 51 and 52, 53, respectively, carry horizontal pins 54 and 55, surrounded by a rotatable bush 56 or 57, respectively. The bush 56 or 57, carries an arm 58 or 59, respectively, through the free extremity of which a pin 60 or 61 passes. The pins 60 and 61 are further mounted in lateral extensions of a vertical bush 62 in which the shaft 211 connected at 211A to the axle 213 of the running wheel 202 is rotatably mounted. The pins 54, 55, 60 and 61 have parallel center lines, the distances between the pins 54 and 55 and between the pins 60 and 61 being equal, while also the distances between the pins 54 and 60 and between the pins 55 and 61 are equal, so that the bush 62 at a given position of the beam 201 can be only displaced through positions which are all parallel to each other.

Moreover, the beam 201 carries a lateral extension 63 and the bush 62 is provided with an arm 64 extending upwardly in oblique direction. Between the ends of the arms 63 and 64 a tension spring 65 is provided. The position and arrangement of the arms 63 and 64 are such that the center line of the helical spring 65 is vertical and has a distance to the center line of the bush 62 which is equal to the distance of the axle 213 of the wheel 202 to the center line of the bush 62, the spring 65 being moreover located in the plane of the wheel 202, if the latter is in one of the positions which most frequently occur during operation. Thus, the pins 54, 55, 60 and 61 are relieved from the pressures which would be otherwise produced by the weight of the side delivery rake.

A fourth embodiment of the resilient running wheel is shown in Figs. 7 and 8. This embodiment differs from the last embodiment by the manner in which the device is provided for locking in position the running wheel which is swingable about a vertical axis. The structural parts corresponding to those illustrated in Fig. 2 have been designated by the same reference numerals as in Fig. 2.

According to Figs. 7 and 8, the abutting member 17 for the compression spring 16 is provided with a horizontal arm 66. The beam 1 carries an extension 67 through which passes a thin flexible steel strip 68 curved in its plane and having at one end a fork 69 embracing the end of the arm 66. The arm 66 and the fork 69 are connected together by a vertical pin 70. The strip 68 can be clamped in the extension 67 by means of a crank 71 at the end of a screw spindle 72 which can be screwed in a threaded vertical channel 72A in the head of the extension 67. When the shaft 11 slides axially within the bush 10, this is attended by a bending of the strip 68 which, however, even in its bent positions, due to the clamping action of the screw spindle 72 prevents considerable rotation of the shaft 11 in the bush 10.

There will now be obvious to those skilled in the art many modifications and variations utilizing the principles set forth and realizing many or all of the objects and advantages of the apparatus described but which do not depart essentially from the spirit of the invention.

What is claimed is:

1. A device for laterally displacing rakeable substance lying on the ground comprising a frame; axle means mounted on said frame; running wheels supporting said frame for ground traversing movement; a raking member supported by said axle means on said frame for free rotation and arranged obliquely with respect to the direction of movement of said frame, said raking member being put into rotation by contact with the ground traversed; and elastic means supporting the running wheels on the frame, said elastic means including running wheel supports coupled to said running wheels to enable the same to move vertically with respect to the frame, said elastic means maintaining said running wheel supports in a fixed angular relationship to said frame.

2. A running wheel mounting for the frame of a raking device for laterally displacing rakeable substance lying on the ground comprising a running wheel; a wheel axle supporting said running wheel; a vertical shaft connected to said wheel axle; a bearing member supporting said vertical shaft for rotation of the latter about a vertical axis; a supporting structure hingedly connecting said bearing member to the frame of the raking device and permitting displacement of said bearing member in relation to said frame through positions which are all parallel to each other; and a helical spring extending vertically and connected to said supporting structure and said frame to resist upward movement of said running wheel relative to said frame, the center line of said helical spring extending through the center line of the running wheel in at least one position of said bearing member.

3. A running wheel mounting as defined in claim 2 comprising horizontal hinge means and wherein the supporting structure comprises at least one parallelogram of elements which are hingedly connected to each other at said horizontal hinge means, selected of which are connected to the frame.

4. A running wheel mounting as defined in claim 2 wherein said supporting structure comprises at least one parallelogram of hingedly connected together elements connected to the frame for swinging movements relative to horizontal axes, said spring being a tension spring acting between said bearing member and the frame.

5. A running wheel mounting for the frame of a raking device for laterally displacing a rakeable substance lying on the ground, comprising a running wheel; a wheel axle supporting said running wheel; a vertical shaft connected to said wheel axle; a guiding member fixedly connected to the frame of the raking device; said vertical shaft being mounted for rotation and vertical displacement in said guiding member; a compression spring provided between the guiding member and an abutment on the part of said vertical shaft extending beneath said guiding member; and a compression spring provided between the guiding member and an abutment on the part of said vertical shaft extending above said guiding member.

6. A running wheel mounting as defined in claim 5 wherein the upper end of said vertical shaft is provided with locking means for preventing rotation of said shaft in said guiding member.

7. A running wheel mounting as defined in claim 6, wherein said locking means includes a laterally extending arm and a flexible bar, the upper end of said vertical shaft carrying said laterally extending arm at the end of which said flexible bar is fixed, said flexible bar being movable in two directions with regard to the frame of the raking device, and clamping means for clamping said flexible bar to the frame in the desired position.

8. A running wheel mounting as defined in claim 6, wherein said locking means includes a laterally extending locking member, the upper end of said vertical shaft carrying said laterally extending locking member and a curved member fixedly secured to the frame, said curved member having a plurality of notches provided in its upper edge, said laterally extending locking member being engageable in a selected one of the plurality of notches provided in the upper edge of said curved member, said curved member being coaxial with the vertical axis of rotation of the running wheel.

References Cited in the file of this patent
UNITED STATES PATENTS

| | | |
|---|---|---|
| 614,137 | Seitz | Nov. 15, 1898 |
| 828,571 | Rodemeyer | Aug. 14, 1906 |
| 935,456 | Blackstone et al. | Sept. 28, 1909 |
| 974,893 | Lathrop | Nov. 8, 1910 |
| 2,028,332 | Johnson | Jan. 21, 1936 |
| 2,680,343 | Enos, Jr. | June 8, 1954 |
| 2,689,446 | Sorrels | Sept. 21, 1954 |
| 2,712,723 | Ryan | July 12, 1955 |